May 8, 1934.   F. OTTO   1,957,724
INTERMEDIATE CONNECTION FOR HAULAGE CAGES
Filed Jan. 15, 1932   3 Sheets-Sheet 1
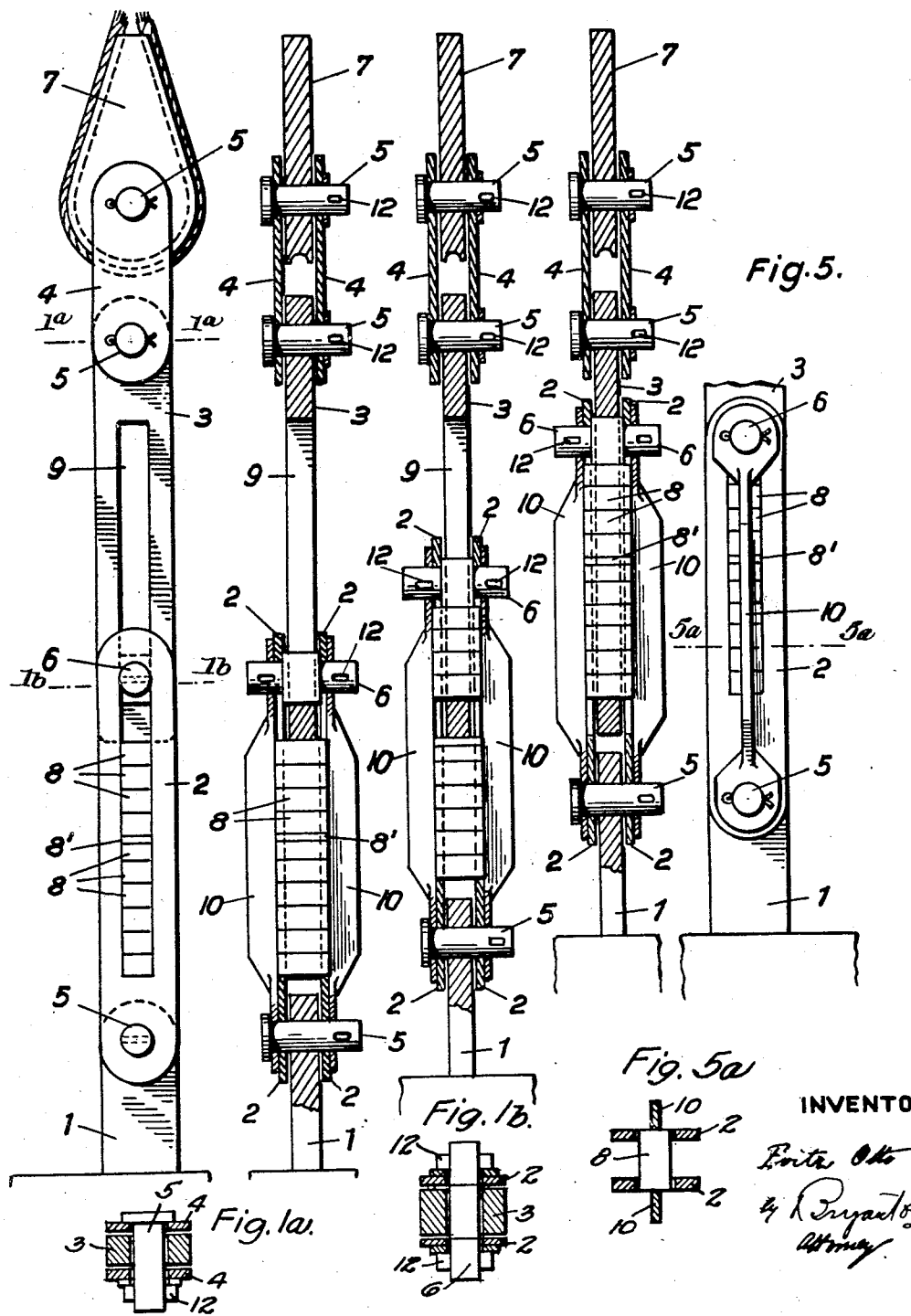

May 8, 1934.  F. OTTO  1,957,724
INTERMEDIATE CONNECTION FOR HAULAGE CAGES
Filed Jan. 15, 1932   3 Sheets-Sheet 2
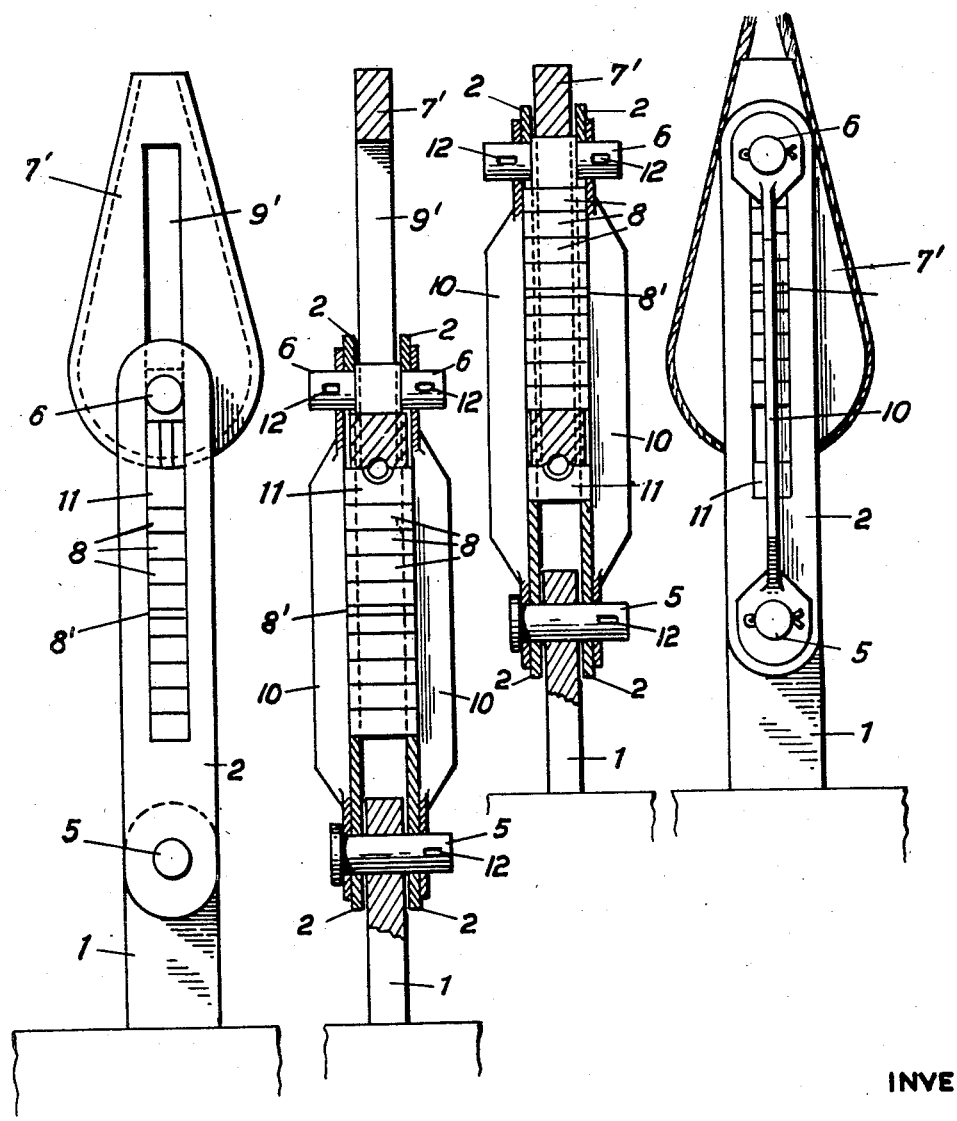
INVENTOR:

May 8, 1934.   F. OTTO   1,957,724
INTERMEDIATE CONNECTION FOR HAULAGE CAGES
Filed Jan. 15, 1932   3 Sheets-Sheet 3
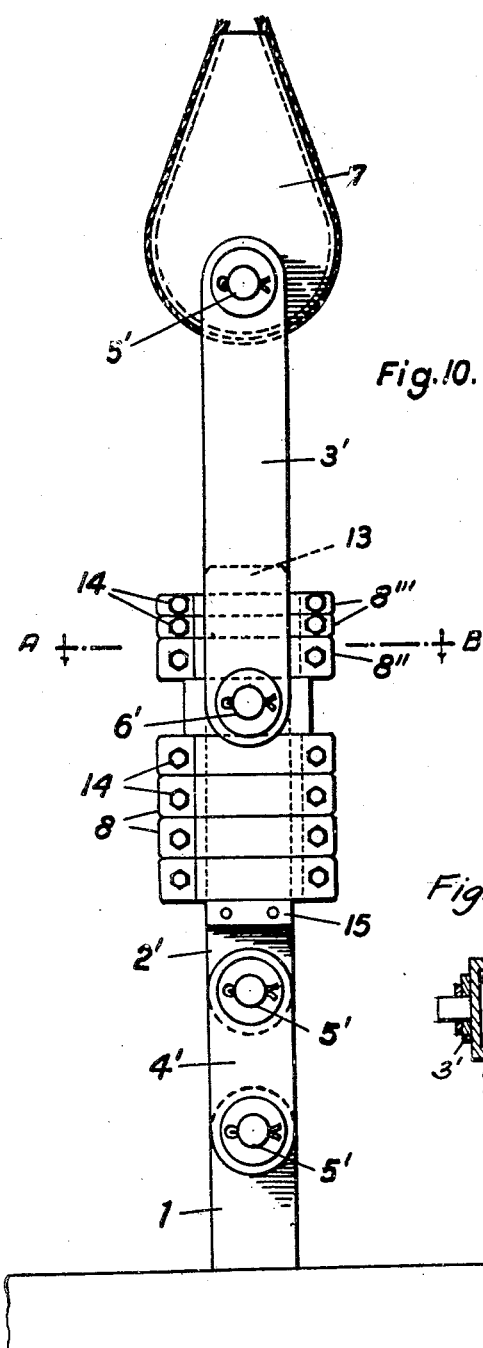
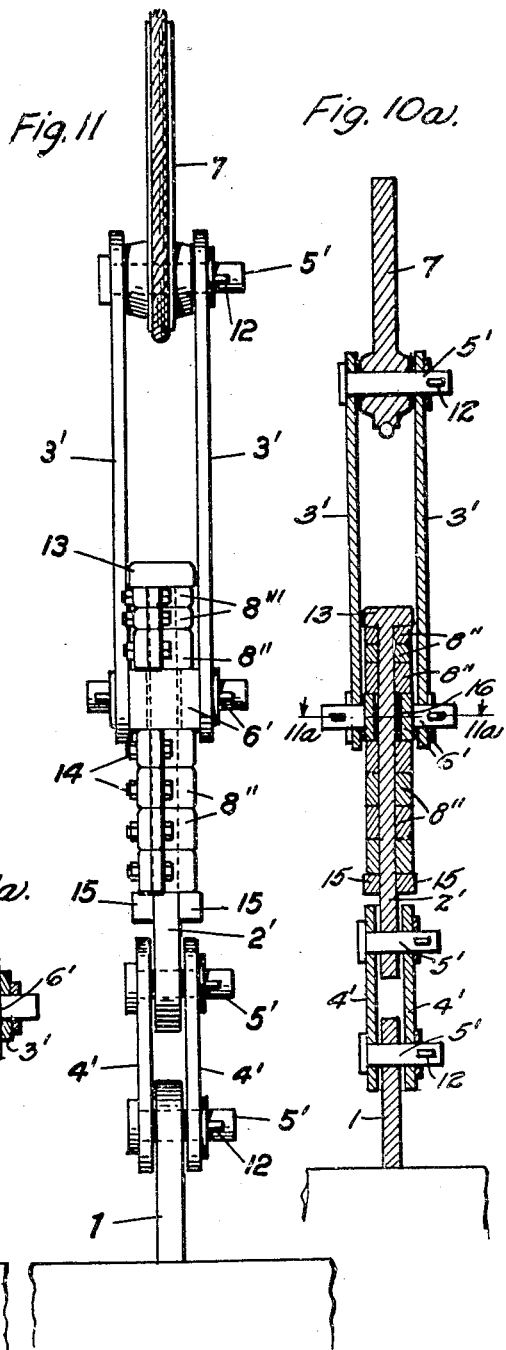
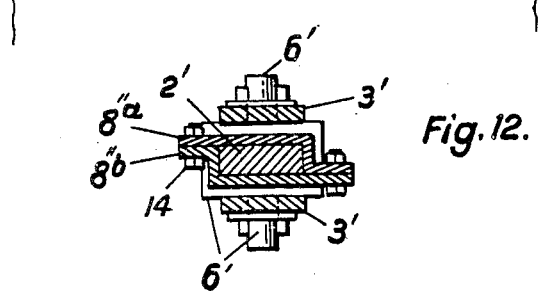
INVENTOR:
Fritz Otto
by Bryant Lowry
Attorney Patented May 8, 1934

1,957,724

UNITED STATES PATENT OFFICE 1,957,724

INTERMEDIATE CONNECTION FOR HAULAGE CAGES

Fritz Otto, Dusseldorf, Germany

Application January 15, 1932, Serial No. 586,943
In Germany January 23, 1931

6 Claims. (Cl. 187—1)

For adjusting the length of the haulage cable for the cage many devices have been proposed. A simple adjustment of the cable length can be effected for example by a cable binding, in which the end of the cable is pressed around a roller provided on the dead-eye and fixed by means of clamps on an extension of the dead-eye. The extension piece is connected to the dead-eye through the intermediary of a screw spindle. In adjusting cable lengths the clamps holding the cable end are detached after relieving the haulage rope, and the dead-eye is shifted towards or away from the extension piece by means of the screw spindle. The cable end is then pulled according to the lengthening of the cable, after which it is again fixed by the clamps. The possibility of using these cable bindings is limited by the extremely heavy weight of the cable bindings.

Intermediate connections with adjustable links necessitate a very long constructional length of the intermediate connection piece in the case of newly fitted cables. The links provided with several adjusting holes have more or less long dead lengths between the adjusting holes, according to the strength of the material, wherefrom results a corresponding undesirable increase of the dead load. Moreover, the interchanging of the adjusting links is complicated and wastes time, because the fastening of the intermediate connection piece must be loosened for the adjustment. Only a rough adjustment is possible according to the distribution of the holes for the adjusting bolts, so that the objections of very inaccurate adjustment of the cages must be reckoned with.

The intermediate connections with adjusting spindles allow of fine adjustment, but are not popular, owing to the danger of breakage and should moreover not be allowed, if they are not employed in conjunction with parallel supporting links which take up the load of the cage in the event of a spindle fracture. In the case of main haulage with heavy loads no screw spindles at all should be employed in all cases where high cable speeds exist, on account of the rapid wear between the screw spindle and supporting nut and on account of the dangers resulting therefrom.

As intermediate connections usually consist of two traverses the lower of which is connected to the main rod and the upper to the rope connection and both of which are connected together by screw spindles extending through their ends and engaging the screw thread of wire nuts bearing on the traverses, these intermediate connections are too wide. The traverses are subjected to bending stresses and for this reason and on account of the weakening of the cross section by the screw spindles engaging therethrough, are made very thick especially in height. This height of the traverses is called "dead height" because it occupies a considerable portion of the height available between the cage and the rope pulley. The supporting nuts must also be very strong. This however results in an undesirable increase in weight, besides requiring a relatively large space.

As is known efforts are made to keep the connecting element between the cage and hauling rope as light as possible. Therefore the use of light metal has been proposed. Thus, for example, on page 432 of No. 36 of the Journal "Der Bergbau" dated October 1, 1931 in the article entitled "Weights of miners trucks and cages", it is generally stated in connection with intermediate connections in hoisting means: The weights can be reduced by employing material having great strength and light metal. The employment of light metal, however, necessitates many times higher initial costs than the usual constructional material and can therefore only be used in exceptional cases.

This invention relates to a connection piece between the haulage cable and the cage, and need only be as long as is necessary for the insertion of the distance pieces and thus possesses all the advantages of light weight, besides the great advantage that it allows of fine adjustment similar to that obtained when employing screw spindles. This intermediate connection piece according to the invention is produced by providing distance pieces as adjusting elements for adjusting the cable length and for height adjustment of the cage. The number of distance pieces inserted can be varied so that it is possible to regulate the distance as desired in the direction of the cable between the two bearing points of the connecting links. Thus, the adjustment of the cable length and the height adjustment of the cage is obtained.

Several embodiments of the invention are illustrated by way of example in the accompanying drawings in which:—

Fig. 1 shows in side elevation an intermediate connection with the cable still unelongated.

Fig. 1a is a section on line 1a—1a of Fig. 1.

Fig. 1b is a section on line 1b—1b of Fig. 1.

Fig. 2 is a vertical section through the middle of Fig. 1.

Figs. 3 and 4 show in section the adjustment of the intermediate connection after elongation of the cable.

Fig. 5 is a side elevation showing the longitudinal fixation of the distance pieces.

Fig. 5a is a section on line 5a—5a of Fig. 5 showing a single distance piece in top plan view.

Figs. 6 to 9 are similar views to Figs. 1 to 5 of a modified form of construction.

Fig. 10 is a side elevation and

Fig. 11 a front elevation of a second modification.

Fig. 10a is a longitudinal section through the form of construction shown in Figs. 10 and 11.

Fig. 11a is a cross section on line 11a—11a of Fig. 11.

Fig. 12 is a section according to line 12—12 of Fig. 10 through the form of construction shown in Figs. 10 and 11.

The connection piece illustrated in Figs. 1 to 5 between the haulage cage and the cable consists of a main rod 1, two supporting links 2, a supporting link 3, two supporting links 4, connecting bolts 5, transverse bolt 6 and dead-eye 7. The supporting link 3 has a longitudinal slot 9 in which the traverse bolt 6 is guided and on the pins projecting one on each end from the traverse bolt 6 the links 2 are suspended. For adjusting the cable length and for effecting the desired height adjustment of the cage, distance pieces 8 are provided. In the examples illustrated there are eleven such distance pieces. The distance pieces 8' are of different thickness. It is evident, that more distance pieces or all the distance pieces may be of different thickness, so that a very fine height and equalization can be obtained. When the distance pieces 8 are not in use as, in the case of a newly mounted cable, they are piled in the non-loaded slot portion of the links 2 and are thus always available in this magazine. If it is necessary, to shorten the intermediate connection piece by for example four distance pieces 8, owing to elongation of the cable, the distance between the opposite bearing points of the slot apertures is increased, after relieving the cable, by inserting the distance pieces in the slot 9 under the transverse bolt 6, so that the intermediate connection piece is shortened (Fig. 3). Fig. 4 shows the maximum adjustment. All the distance pieces 8 have been inserted through the two links 2 and the middle link 3. For securing the distance pieces in position auxiliary links 10 are provided on both sides of the slot aperture formed by the links 2 on the sides having the aperture for inserting. In order to adjust it is only necessary to remove one of the auxiliary links. The distance pieces can then be removed by exerting blows on the distance pieces on both sides of the other auxiliary link.

In the form of construction illustrated in Figs. 6 to 9 the slot aperture 9' is provided in the dead-eye 7'. Figs. 6 and 7 show the position of the connection, when a new hoisting cable is being mounted. All distance pieces are situated below the dead-eye in the unloaded slot portion, namely the magazine formed by the links 2. Figs. 8 and 9 show the maximum adjustment. All distance pieces have been inserted through the slot aperture of the links 2 and the slot aperture of the dead-eye 7'. The straight support of the distance pieces under the dead-eye is ensured by an intermediate element 11.

The bolts 5 and the transverse bolt 6 are fixed in position by split pins inserted in holes 12 in the bolts 5.

In the form of construction shown in Figs. 10 to 12 two supporting links 3' and only one supporting link 2' are provided. The supporting link as shown in Fig. 12 is rectangular in cross section, is inserted through a bore 16 of the transverse bolt 6' and has a head 13. The distance pieces 8'' are each made in two parts 8''a and 8''b, held together by the screws 14 and enclosing the supporting link 2'. The cable being not elongated, all distance pieces are on the portion of the supporting link 2' situated below the transverse bolt 6', this portion forming in this case the magazine for the distance pieces. Small plates 15, fixed by screws on the lower portion of the link, form rests for the distance pieces. The cable being elongated, the distance pieces 8'' are removed from the portion of the supporting link 2' after the screws 14 have been unscrewed, and the distance pieces are then fixed on the supporting link 2' between the head 13 of the same and the transverse bolt 6', so that the bearing surface of the supporting link 2' formed by the link head 13 is moved away from the transverse bolt 6' and the intermediate connection is shortened. The connection of the supporting link 2' with the main rod 1 is effected through the intermediary of the portion 4' of the supporting link and the bolts 5'.

In order to attain any desired fine adjustment, it is sufficient to subdivide a distance piece into as many thin pieces as desired. Instead of the supporting links and the cable dead-eye any other intermediate element can be provided between the cable and the cage, and also the main rod may have an aperture for accommodating the distance pieces. The distance pieces may be made in any suitable shape and secured against slipping out of the apertures in the supporting links and the like by any other suitable means than by the auxiliary links 10. Further, several adjusting elements, for example of the type described, may be employed arranged one above the other.

I claim:—

1. An intermediate connection for connecting a haulage cage to a haulage cable, comprising in combination a link chain consisting of two link elements, one link element having in the direction of the cable a guide for the shifting of the other element in the direction of the cable, each of said elements provided with an abutment to limit the pulling apart movement of said elements, the abutment of one of said link elements carrying the other link element by means of its abutment, and distance pieces adapted to be inserted between the abutments to compensate for stretching in the cable and adjust the height of the cage.

2. An intermediate connection for connecting a haulage cage to a haulage cable, comprising in combination a link chain consisting of two link elements, one link element having a longitudinal slot in the direction of the cable, both elements interengaging and having each an abutment adapted to limit their pulling apart movement, the abutment of one of said elements carrying the other of said elements by means of its abutment and guided in the longitudinal slot in the other of said elements, and distance pieces adapted to be inserted between the abutments to compensate for stretching in the cable and adjust the height of the cage.

3. An intermediate connection for connecting a haulage cage to a haulage cable, comprising in combination a link chain consisting of two link elements, each of said link elements having a longitudinal slot in the direction of the cable, both elements interengaging and having an abutment adapted to limit the pulling apart movement of said elements, the abutment of one of said link elements carrying the other of said elements by means of its abutment guided in the longitudinal slot of said first mentioned element, and distance pieces adapted to be inserted between the abutments to compensate for stretching in the cable and adjust the height of the cage.

4. An intermediate connection as specified in claim 3 in which the portion of the slot in the link elements not serving as bearing surfaces for the abutments serves as magazine for the distance pieces not required.

5. An intermediate connection as specified in claim 3, comprising in combination with the link chain, a dead eye forming a link of said chain and having a slot aperture in the direction of the cable.

6. An intermediate connection as specified in claim 1 comprising in combination with the link elements, a head on one of said link elements, a transverse bolt carried by the other of said link elements having a bore guiding said first mentioned link element the head of which bears on said bolt, and distance pieces adapted to be inserted between said head and said transverse bolt to adjust the distance between the bearing surfaces of said head and said transverse bolt corresponding to the elongation of the haulage cable and the height adjustment of the haulage cage.

FRITZ OTTO.